United States Patent

[11] 3,575,023

| [72] | Inventor | Yasushi Shimizu<br>Ohmiya, Japan |
|---|---|---|
| [21] | Appl. No. | 868,543 |
| [22] | Filed | Oct. 22, 1969 |
| [45] | Patented | Apr. 13, 1971 |
| [73] | Assignees | Nissan Motor Company, Limited<br>Yokohama Japan;<br>Kanto Seiki Company, Limited<br>Ohmiya, Japan |
| [32] | Priority | Oct. 24, 1968 |
| [33] | | Japan |
| [31] | | 43/77516 |

[54] STEERING LOCKING DEVICE FOR MOTOR VEHICLES
5 Claims, 14 Drawing Figs.

| [52] | U.S. Cl. | 70/252 |
|---|---|---|
| [51] | Int. Cl. | B60r 25/02 |
| [50] | Field of Search | 70/252, 186 |

[56] References Cited
UNITED STATES PATENTS

| 2,036,370 | 4/1936 | Smith | 70/252X |
| 2,063,088 | 12/1936 | Fitzgerald | 70/252 |
| 2,101,446 | 12/1937 | Neiman | 70/252X |

FOREIGN PATENTS

| 995,049 | 6/1965 | Great Britain | 70/252 |
| 1,042,521 | 9/1966 | Great Britain | 70/252 |
| 670,420 | 10/1964 | Italy | 70/252 |

*Primary Examiner*—Albert G. Craig, Jr.
*Attorney*—John Lezdey

ABSTRACT: A steering locking device for locking the steering shaft of a motor vehicle having a lock cylinder rotatable by a key and locking means. The locking device comprising a control member rotatable with the lock cylinder and operatively connected with an ignition switch, and a rotary member cooperating with the control member to hold the locking means in the unlocked position irrespective of the position of the key and upon removal of the key locks the steering shaft.

Patented April 13, 1971

Yasushi Shimizu INVENTOR

BY John Lezdey ATTORNEY

Yasushi Shimizu INVENTOR

BY
John Lezdey ATTORNEY

Yasushi Shimizu INVENTOR

BY
John Lezdey ATTORNEY

Patented April 13, 1971  3,575,023

Yasushi Shimizu INVENTOR

BY

John Lezdey ATTORNEY

Yasushi Shimizu INVENTOR

BY

John Lezdey ATTORNEY

Patented April 13, 1971 3,575,023

Yasushi Shimizu INVENTOR

BY John Lezdey ATTORNEY

STEERING LOCKING DEVICE FOR MOTOR VEHICLES

This invention relates generally to a steering system of an automotive vehicle and, particularly, to a device for locking the steering shaft of such system for antitheft purposes when the vehicle is not occupied.

Typical of the various steering locking devices thus far proposed is the steering locking device using a member for engaging the key with the locking means of the device and a spring for engaging the locking means with the steering shaft. The engaging member being mounted on the locking means, the key, as it is rotated to its "lock" position, bears at its tip portion the pressure exerted by the spring. Since, in this instance, the spring should be designed to exert a considerably large amount of pressure for practical purposes, the tip of the key and/or the portion of the engaging member to abut against the key tend to wear in a long run, resulting in a loose engagement between the key and engaging member. It therefore sometimes happens that the steering shaft is accidentally locked only if the key is turned to the locking position before the key is removed from the locking device. Thus, the steering locking device of this type has a drawback in that there is the possibility of the steering shaft being locked only if the key is rotated either purposely or inadvertently by the driver while the vehicle is running.

This locking device of prior art also uses a control member controlling the motion of the locking means independently of the engaging member which is mounted on the locking means. The locking means is maintained in its retracted or unlocking position by the control member when the key is in the "on" or "start" position and by the engaging member when the key is in the "lock" position. Thus, means for holding the locking means in the unlocking position is changed from the control member to engaging member as the key is shifted from the "on" or "start" position to the "lock" position. This invites an instability of the operation of the locking device and, hence, the locking device is, again, considered unsatisfactory for practical purposes.

This invention is intended to eliminate these and other drawbacks thus far encountered in the prior art steering locking devices and it is an important object of the invention to provide an improved steering locking device featuring high reliability in performance.

Another important object of this invention is to provide a steering locking device which is adapted to prevent the steering shaft from being accidentally locked while the vehicle is running.

Another important object of this invention is to provide a steering locking device which is adapted to relieve the key from wear at its tip portion.

Another important object of this invention is to provide a steering locking device in which the key, as it is turned to the "lock" position, bears at its tip portion only a minimum of stress from the spring. The key can be nevertheless removed from the locked device with a minimum of effort by human fingers.

Another important object of this invention is to provide a steering locking device in which the compression by the spring is converted into an angular moment to significantly save the stress applied to the tip of the key being rotated.

In order to achieve these objects, the steering locking device embodying this invention uses a rotatable control member and a rotary member mounted either concentrically or coaxially to the control member. The control and rotary members, which are operatively connected to the locking means, cooperate with each other to hold the locking means in its retracted or unlocking position irrespective of the position ("start", "on", "garage" or "lock") of the key inserted into the lock cylinder. The rotary member, which is concentrically or coaxially mounted in the control member with the aid of a resilient member, is in engagement with the tip portion of the key. A rotational force is imparted to the rotary member by the action of the resilient member when the key is in the "lock" position. The rotational force is restricted by the key engaging with the rotary member. The compression by the spring is converted into angular moment of the rotary member so that the key only bears this angular moment at its tip portion. It will thus be appreciated that the stress exercised on the key held in the "lock" position to keep the locking means in its retracted position is reduced to a minimum.

According to this invention, moreover, each of the control and rotary members has a notch in its peripheral wall to cooperate with each other to hold the locking means in its retracted position. The locking means is thus held in its retracted position with satisfactory stability by these two cooperative members in whichever position the key is held.

In order that this invention may be more readily understood two embodiments of this device will now be described by way of example, and with reference to the accompanying drawings, in which.

Figure 1:
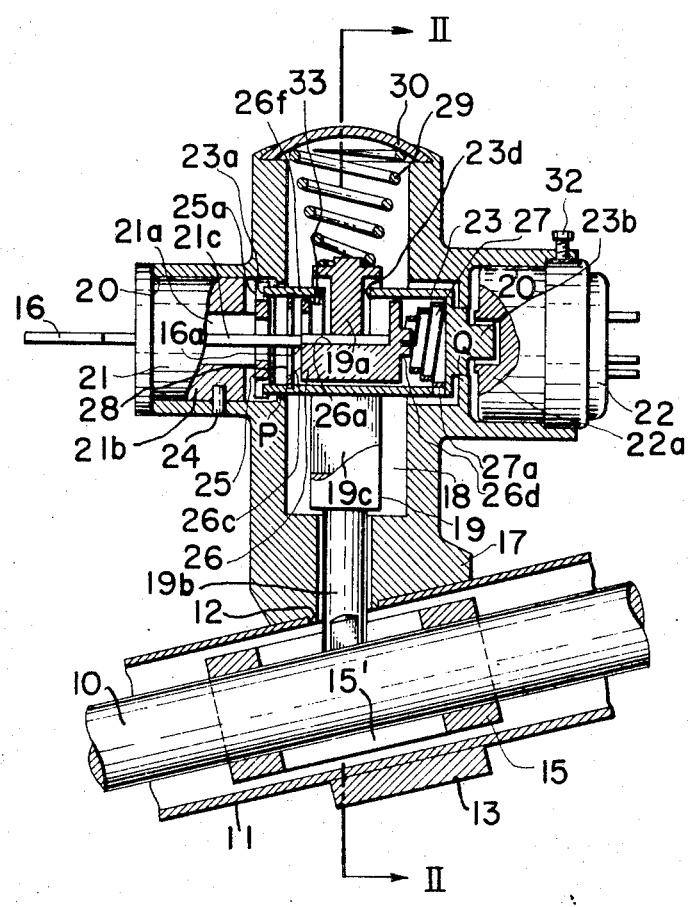
FIG. 1 is a sectional view of a steering locking device according to this invention held in its locking position.

Referring now to FIG. 1, a steering locking device of a motor vehicle according to this invention comprises a steering shaft 10 connected with a steering wheel (not shown). The steering shaft 10 is encased in a jacket tube 11 having an opening 12 which determines the position of the steering locking device. The locking device is secured to the jacket tube 11 by a bracket 13 and bolts 14. To the steering shaft 10 is welded or screwed a collar 15 provided with a plurality of axial grooves 15'. Designated at 16 is a key adapted for operating the locking device.

The steering locking device is enclosed in a housing 17 a stepped main bore 18 extending in and through the housing 17 to permit locking means 19 to move therein. The housing has also formed therein an auxiliary bore 20 crossing the main bore 18. This auxiliary bore is chiefly intended for accommodating a lock cylinder 21 and ignition switch 22. A control member 23 is provided at the crossing of the bores 18 and 20. The control member 23 operatively connects the lock cylinder 21 with the locking means 19 and ignition switch 22.

Figure 3:
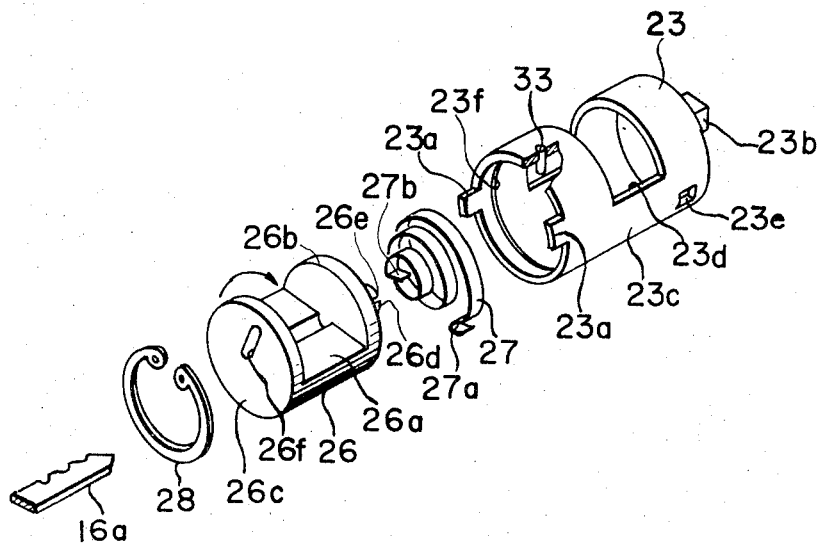
FIG. 3 is an exploded view of the essential parts of the device of this invention.

The lock cylinder 21 comprises an inner cylinder 21a and an outer cylinder 21b. The outer cylinder 21b is secured to the housing 17 by a knockpin 24. The inner cylinder 21a has provided therein an axial slot 21c to receive the key and is rotatably mounted in the stationary outer cylinder 21b together with the key. Secured or caulked to the inboard end of the inner cylinder 21a is an annular joint plate 25 having notches 25a at its outer periphery. The control member 23, which is generally cylindrical as best seen in FIG. 3, is opened at its end facing the joint plate 25 and closed at its opposite end. The control member 23 has projections 23a at its open end, the projections being shown as two in number by way of example. The projections 23a are so configured as to be engageable with the notches 25a to rotate the control member 23 as the joint plate 25 is rotated. The control member 23 is rotatably supported in the housing 17 at the points indicated by P and Q in FIG. 1. The control member 23 also has at its closed end a coupling 23b projecting therefrom. The coupling 23 is operatively connected to the ignition switch 22. In the peripheral wall 23c of the control member 23 is formed a window 23d which is sized in such a manner that it admits of the entry of the wall portion 19a of the locking means 19 its peripheral edges form a semicircular arcs.

The control member 23 has mounted therein a rotary member 26 and resilient member 27. The rotary member 26 is constituted by a semicylindrical body 26a and inner and outer circular flanges 26b and 26c, respectively, attached integrally to the ends of the semicylindrical body, thus forming a semicylindrical recess between the flanges 26b and 26c. The resilient member 27, which is shown as a volute spring, has a hook 27a at its outer end and an axial projection at its inner end.

The control member has formed in its peripheral wall 23c a slot 23e and the resilient member 27 is securely mounted in the control member 23 through engagement of the hook 27a and slot 23e.

The rotary member 26 has a boss 26d extending from the flange 26b and a groove 26e is formed axially in this boss 26d to securely receive the projection 27b of the resilient member 27. The rotary member 26 is, thus, at all times subjected to an angular moment and axial force from the resilient member 27 through the flange 26b. The rotary member 26, complete with the resilient member 27, is axially and peripherally slidably in the control member 23. The rotary member 26 has formed in the outer flange 26c a hole 26f into which the tip portion of the key 16 is inserted preventing the rotary member 26 from rotating. A groove 23f is provided circumferentially in the inside wall of the control member 23. A snapring 28 is fitted in this circumferential groove 23f to prevent the rotary member 26 from being released out of the control member 23 due to the pressure from the resilient member 27.

Figure 2:
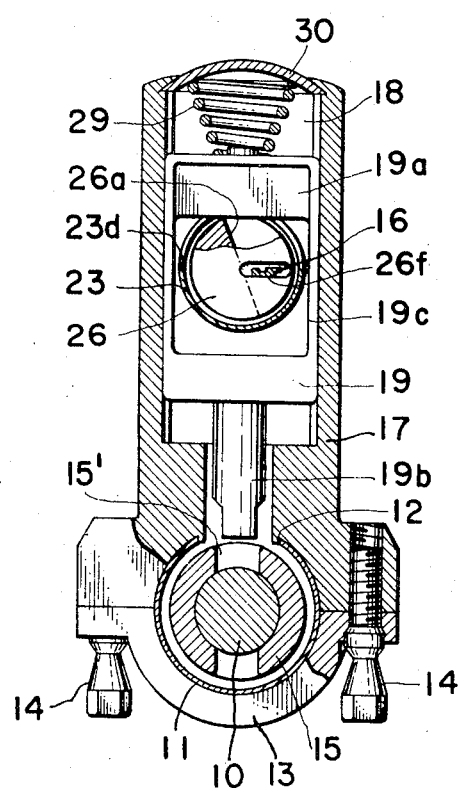
FIG. 2 is a section on line II—II of FIG. 1, the device being shown in its unlocking position.

As best seen in FIG. 2, the locking means 19 includes a rod portion 19b and frame portion 19c. The frame portion 19c and wall portion 19a defined an opening into which the control member 23 is inserted.

A spring 29, which is preferably a helical spring as shown, is mounted between the outer face of the wall portion 19a of the locking means 19 and a cap 30 mounted at the open end of the bore 18 in the housing 17. The spring 30 serves to depress the wall portion 19a of the means 19 against the axial edges of the window 23d of the control member 23.

The locking means 19 is shown in FIGS. 1 and 2 to be a unitary piece. If desired, however, this locking means 19 may be, constructed by two pieces made of suitable materials.

Figure 4:
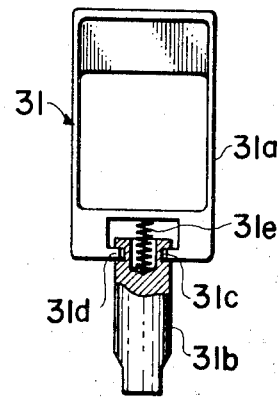
FIG. 4 is a sectional view of a modified form of the locking means used in the device of this invention.

FIG. 4 illustrates an example of such two-piece locking means 31. The locking means 31, as shown, comprises a wall-and-frame piece 31a and a rod piece 31b. The wall-and-frame piece 31a and rod piece 31b are connected with each other by means of a notch 31c provided in the latter and a projection 31d formed on the former. The locking means 31 thus constructed is useful for absorbing the shocks carried from the wall-and-frame piece 31a to the rod piece 31b at the junction therebetween. For this purpose, it may be advantageous to mount a spring 31e between the two pieces as illustrated.

Figure 12:
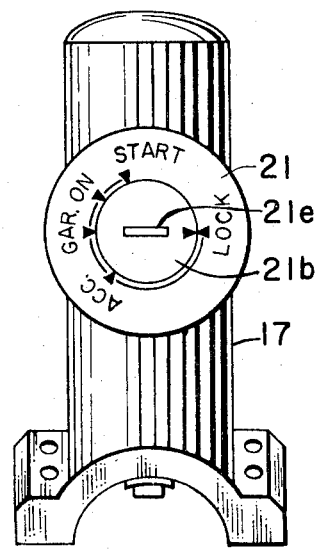
FIG. 12 is a front view of the device according to this invention.

The ignition switch 22 which is removably mounted on the housing 17 by a screw 32 is connected to the inner cylinder 21a of the lock cylinder 21 via the control member 23. Thus the rotation of the key 16 can be carried to the moving part 22a of the ignition switch 22. As is known, the ignition switch 22 is provided with "on," "start," "garage," "accessory" and "lock" positions, as shown in FIG. 12. When the key is inserted into the slot 21c and rotated to the "start" position, the power source is connected to the terminals of the starter and ignition switches keep the locking device inoperative. When the key 16 is rotated to the "on" position, the power source is connected to both the ignition terminal and accessory terminal so that the locking device is still kept inoperative. When the "garage" position is selected, the power source is disconnected from all the terminals and the locking device is invariable inoperative. When the "accessory" position is selected, the power source is connected to the accessory terminal and the locking device also remains inoperative. When, the key is turned to the "lock" position, the power source is disconnected from all the terminals and the locking device is kept inoperative until the key is removed.

The operation of this invention will now be described hereinafter.

Figure 6:
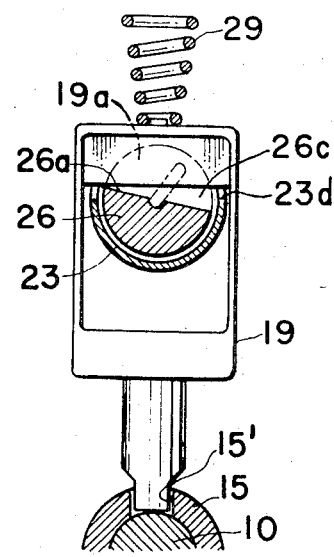

When the steering shaft 10 is kept locked as shown in FIG. 1, the window 23d of the control member 23 is substantially aligned with the recess in the rotary member 26 as seen in FIG. 6 so that the wall portion 19a of the locking means 19 is forced against the semicylindrical body 26a by the action of the spring 29. This causes the locking means 19 to protrude from the housing 17, the ignition switch 22 being disconnected from the power source, into the groove 15' in the collar 15.

Figure 7:
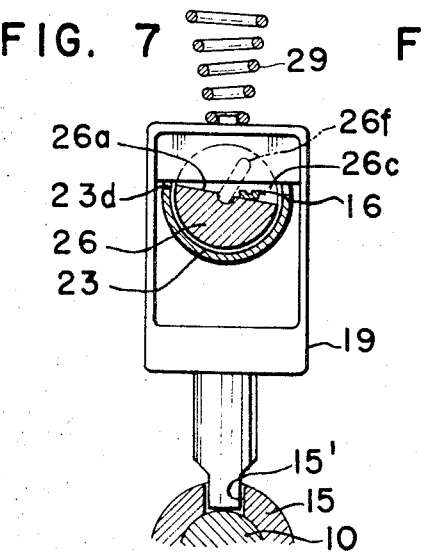

When the key 16 is inserted into the lock cylinder 21, the tip portion of the key 16 is brought into contact with the flange 26c so that the rotary member 26 is forced into the control member 23 against the action of the resilient member 27 as shown in FIG. 7.

Figure 8:
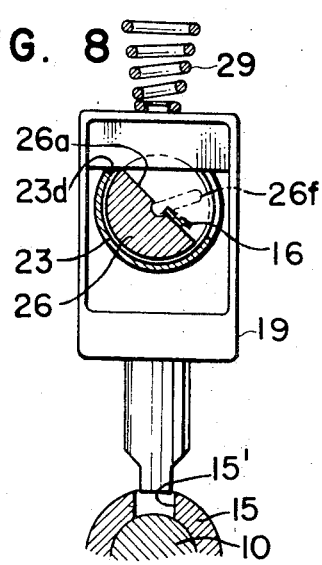

As the key is rotated clockwise, the inner cylinder 21a, joint plate 25 and control member 23 engaging with the joint plate are turned accordingly. Consequently, the axial edge defining the window 23d of the control member 23 depresses the wall 19a of the locking means 19 against the action of the spring 29 as seen in FIG. 8. The locking means 19 thus gradually withdraws from the steering shaft 10. The rotary member 26 in the control member 23 is, in this instance, also rotated in the same direction as the control member 23 by means of the angular moment of the resilient member 27. Therefore, the semicylindrical body 26a is also in contact with the wall 19a.

Figure 9:
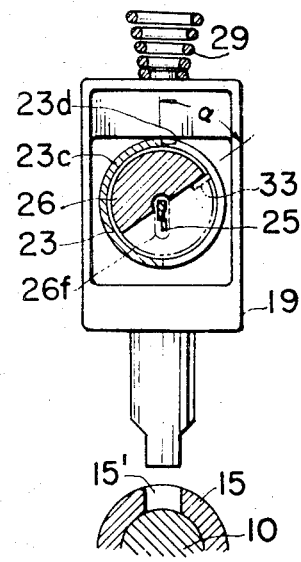

As the key is further rotated clockwise, the locking member 19 completely withdraws from the steering shaft 10, which therefore is now unlocked, as shown in FIG. 9.

After the control member 23 has been turned to the position shown in FIG. 9, the control member 23 assumes a position at a right angle to the original or locking position so that the locking means 19 is held in a position remotest from the steering shaft 10 to contact with the periphery 23d of the control member 23. Consequently, the semicylindrical body 26a of the rotary member 26 no longer contacts the locking means 19. Thus, the rotary member 26 is permitted to rotate even relative to the control member 23 by the action of the resilient member 27 in the direction of arrow in FIG. 3. This rotation of the rotary member 26 causes the tip portion of the key 16 to align with and is inserted into the hole 26f in flange 26c of the rotary member 26. Thus, the rotary member 26 is released from the pressure from the key 16 and is permitted to move toward the lock cylinder 21 until it hits the snapring 28 fixed to the control member through the groove 23e. Such movement of the rotary member 26 permits the tip portion of the key 16 to pass through the hole 26f. The rotation of the rotary member 26 is limited by a stop 33 projecting inwardly from the inner wall surface of the control member 23.

The above-mentioned movement of the rotary member 26 is advantageous in that, if the control member 23 is rotated by the key 16 to the position shown in FIG. 9, then the rotary member 26 also rotates at an additional angle α to securely support the locking member 19 by either the control member 23 or rotary member 26.

Figure 10:
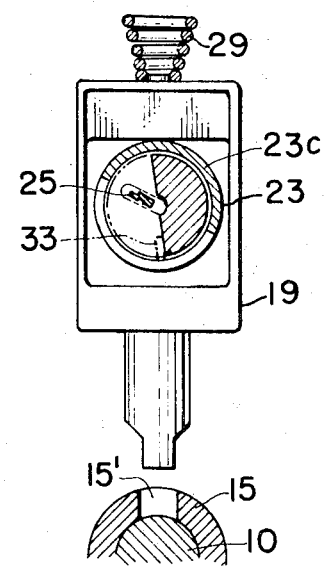

As the control member 23 is further rotated clockwise by the key 16 from the position shown in FIG. 9 to the "on" position as shown in FIG. 10, the locking means 19 is carried on the outer peripheral wall of the control member 23. With the control member 23 held in this position, the ignition switch 22 is connected to the power source.

As the control member is still further clockwise roe rotated about 30° to 45° from the "on" to "start" position, the locking member 19 still rests on the outer peripheral wall of the control member 23.

Figure 11:
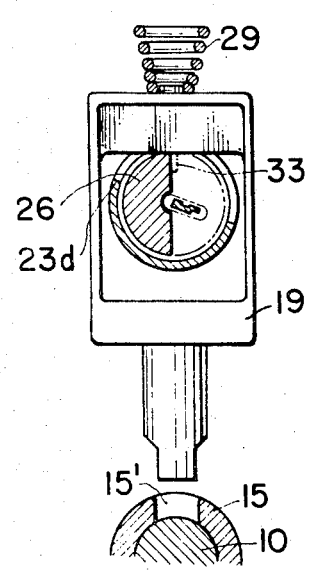

If the key 16 is rotated counterclockwise about 180° from the "on" position shown in FIG. 10, the control member 23 assumes the position shown in FIG. 11 so that the wall portion 19a of the locking means 19 is brought into contact with the semicylindrical body 26a of the rotary member 26. It will thus be understood that the locking means 19 is at all times carried either by the control member 23 or by the rotary member 26 when the key is rotated from the "on" position to the position shown in FIG. 11, preventing the locking means from being brought into the position to lock the steering shaft.

Figure 5:
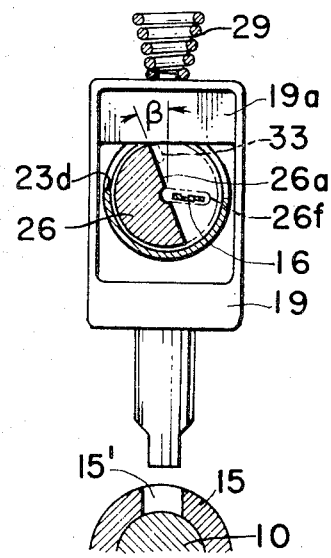
FIGS. 5 to 11 are sectional views illustrating the operation of the device previously shown.

When the key 16 is further turned to rotate the control member 23 to a position remotest from the wall portion 19a of the locking means 19, the rotary member 26 is rotated accordingly to the position shown in FIG. 5. When the rotary member 26 is held in this position, the wall portion 19a of the locking means is carried by the edge of the semicylindrical body 26a of the rotary member 26. As long as the key 16 is kept inserted through the hole 26f in the flange 26c, the wall portion 19a of the locking means 19 is kept to rest on the edge of the semicylindrical body 26a of the rotary member 26 held in situ, namely in a position at an angle $\beta$ from the axis of the locking means 19. The force applied to the locking means 19 from the spring 29 is thus borne by the rotary member 26. The angle $\beta$ may be suitably selected to reduce the angular moment applied to the rotary member 26. Only a force proportional to the component in the tangential direction at the contact point of the wall portion 19a and the edge of the semicylindrical body 26a, which component can be, when the angle $\beta$ is selected properly, far smaller than the spring action.

The rotary member 26 held in this position is permitted to rotate counterclockwise if and only if the key 16 is removed from the hole 26f in the flange 26c. More specifically, when the key 16 is removed from the hole 26f, the semicylindrical body 26a if forced to rotate counterclockwise by the action of the spring 29. The locking means 19, which is carried by the semicylindrical body 26a at its wall portion 19a, is accordingly forced toward the steering shaft 10 to lock it. This is seen in FIG. 6. Since the rotary member 26 must rotate against the action of the resilient member 27 in this instance, this device must be so constructed that the angular moment of the rotary member 26 built up by the spring 29 is greater than that of the resilient member. The energy thus stored in the resilient member 27 during the above-mentioned counterclockwise rotation is used for the rotational movement of the rotary member 26 at an angle $\alpha$ as shown in FIG. 9.

Figure 13:
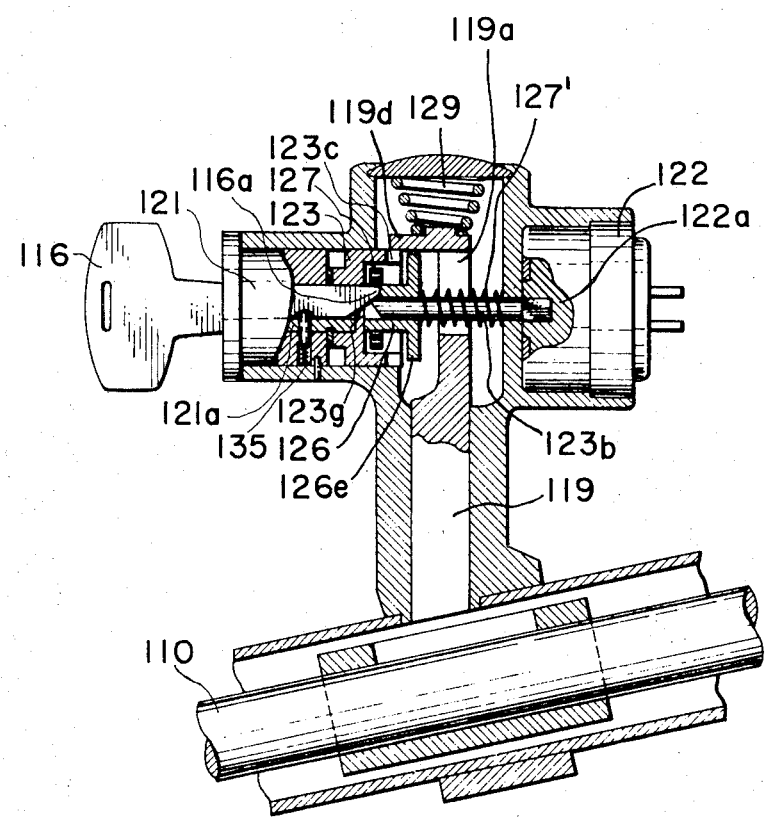
FIG. 13 is similar to FIG. 1 but shows a modification of the device of this invention, the device being shown to be in its unlocking position.
Figure 14:
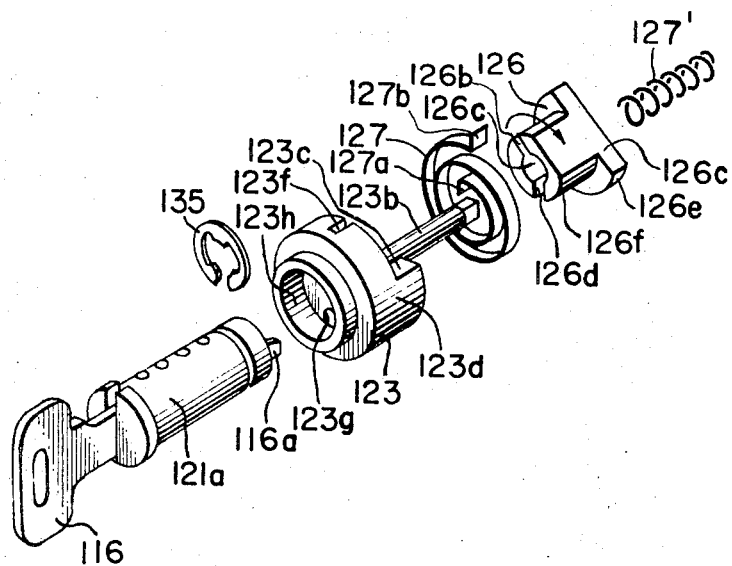
FIG. 14 is similar to FIG. 3 but corresponding to FIG. 13.

FIGS. 13 and 14 show a modified embodiment of this invention. In this embodiment, the control member 123 and the rotary member 126 are positioned in an axially face-to-face relationship with each other. As shown in FIG. 14, the control member 123 is in the partially recessed cylindrical form provided with a hole 123h at one end thereof and is secured unrotatably to the inner cylinder 121a of the lock cylinder 121. This hole 123h has an opening 123g to pass the tip portion of the key 116. The control member 123 has provided integrally at its end remote from the lock cylinder 121 a shaft 123b extending towards the ignition switch 122. The shaft 123b is shaped at its leading end as a square in section, and is engaged with the moving part 122a of the ignition switch 122.

The control member 123 has formed therein a slit 123f to receive the end portion 127b of the resilient member 127. A notch 123c is formed in the peripheral wall 123d of the control member 123.

The rotary member 126 is formed by a boss portion 126f and flange portion 126e. The outside diameter of the flange portion 126e is slightly smaller than that of the control member 123.

The rotary member 126 has formed axially therein a through hole 126c to receive the shaft 123b therethrough. The rotary member 126 also has a flat surface 126a parallel to its axis. The boss 126f is provided at its end surface with a groove 126d for engagement with the tip portion 116a of the key 116. The rotary member 126 receives in its hole 126c the shaft 123b. As shown in FIG. 13, the shaft 123b of the control member 123 secured to the inner cylinder 121a of the lock cylinder 121 is connected to the moving part 122a of the ignition switch 122 through an opening 119a of the locking means 119.

A first resilient member 127, which may be a hair spring, is secured at the inside end 127a thereof to a slit 126b in the boss 126f and, at the outside end 127b, to the slit 123f of the control member 123 for rotating the rotary member 126 in the direction of arrow in FIG. 14.

Through the second resilient member 127', which may be a coil spring, is passed the shaft 123b for pressing the rotary member 126 at all times toward the key 116. The tip portion 116a of the key 116, which is inserted into the inner cylinder 121a of the lock cylinder 121 and which protrudes therefrom, is adapted to engage with the groove 126d of the rotary member 126 through the opening 123g of the control member 123. A grip ring 135 prevents the inner cylinder 121a from being removed.

When, in operation, the key 116 assumes the "park", "on" or "start" position, the flat portion 119d of the locking means 119 pressed in the direction of the steering shaft 110 abuts against the peripheral wall 123d of the control member 123 to hold the locking means 119 in the unlocking position.

When the key 116 is turned to the "lock" position, the notch 123c of the control member 123 comes in contact with the flat portion 119d of the locking means 119. Consequently, the control member 123 no longer holds the locking means 119 in the unlocking position. In this condition, the locking means 119 abuts against the flange 126e of the rotary member 126, imparting an angular moment to the rotary member 126. The rotary member 126 being kept at rest with the tip portion of the key 116 protruding from the lock cylinder 121 to engage with the groove 126d in the rotary member 126, the locking means 119 is prevented from protruding. If the key 116 is removed, the rotary member 126 pressed by the locking means 119 rotates about the shaft 123b against the action of the spring 127, causing the flat surface 126a to contact the flat portion 119d of the locking means 119. Thus, the locking means 119 protrudes to engage with the steering shaft 110.

When in unlocking the steering shaft, the tip portion of the key 116 abuts against the end surface of the boss 126f, causing the rotary member 126 to move rightwardly against the action of the coil spring 127'. If the key 116 is turned to unlock the steering shaft 110, the flat portion of the notch 123c of the control member 123 causes the flat portion 119d of the locking means 119 to move against the action of spring 129, and the locking means gradually withdraws from the steering shaft 110. At this time, the rotary member 126 rotates approximately in the same direction and at the same angle as the control member 123 by the action of the hairspring 127 as shown in FIG. 14. If the control member 123 still further rotates until its peripheral wall 123d abuts against the locking means 119, the rotary member 126 is rotated by the action of the spring 127, causing the tip portion 116a of the key 116 to align with the groove 126d of the rotary member 126. Consequently, the rotary member 126 slides on the shaft 123b by the action of spring 127' toward the key 116, allowing the tip portion 116a of the key 116 and groove 126d to engage with each other. Thus, the rotary member 126 rotates together with the key 116 to complete the unlocking operation.

Different from the first embodiment, the second embodiment includes the rotary member 126 and the control member 123 positioned in an axially face-to-face relationship with each other, two resilient members which may be a hairspring 127 and coil spring 127', shaft 123b extended from the control member 123, on which the rotary member 126 is slidably mounted. Compared with the first example, the second example is more compact, reducing the friction between the rotary member 126 and other members.

It is to be noted that the rotary member 126 is herein described and shown to be mounted concentrically or coaxially relative to the control member 123, however, the former may be made eccentric with the latter, if desired.

As is apparent from the foregoing, the advantages of this invention are as follows:

The locking means can assume the stable unlocking position since both the control member and the rotary member cooperate with each other to control the locking means. When in the locking position, the locking means is at all times on the peripheral wall of either the control member or the rotary member until the key assumes the position immediately before the "lock" position.

When in unlocking, since the rotary member rotates automatically in or adjacent to the control member, the safety angle increases by an angle at which the rotary member has rotated.

When in the "lock" position, the locking means applies an angular moment to the rotary member by the action of the spring. This moment is borne at and by the tip portion of the key engaging with the rotary member. Consequently, the force that must be borne by the key is significantly reduced.

In unlocking, when the key is inserted into the lock cylinder and rotated in a device of prior art, the tip portion of the key must override the spring-biased engaging member mounted on the locking means, making the operation of the key very heavy. In this invention, however, the tip portion of the key rotates abutting against the wall of the spring-baised rotary member until it engages with the rotary member. Therefore, the friction between the individual members is also reduced facilitating the operation of the key, since there is no overriding action of the key.

I claim:

1. A steering locking device for locking the steering shaft of a motor vehicle having a lock cylinder rotatable by a key inserted thereinto, locking means forced toward the steering shaft by a spring action and an ignition switch, comprising a generally cylindrical control member rotatable with said lock cylinder and operatively connected with said ignition switch, said control member having a recessed portion in its peripheral wall and a rotary member axially and circumferentially slidable relative to and resiliently connected to said control member and forced toward said lock cylinder by a spring action, said rotary member having a recessed portion with flat face, said locking means being supported by either of the peripheral walls of said control and rotary members when said key is held in its unlocking position to keep said locking means in a position raised from the steering shaft, wherein, as the key is rotated to the locking position, said control member and said rotary member are forced to rotate until said locking means is supported by an edge of said flat face of said rotary member and (is permitted protrude) upon removal of the key the spring acting on the locking means forces further rotation of the rotary member until said locking means is supported by said flat face with the locking means protruding to a position to lock the steering cylinder.

2. A device according to claim 1, wherein said rotary member is accommodated coaxially and concentrically in said control member.

3. A device according to claim 1, wherein said rotary member is positioned in an axially face-to-face relationship to said control member.

4. A device according to claim 1, wherein said rotary member is subjected by a volute spring to an angular moment and an axial drive toward said lock cylinder.

5. A device according to claim 1, wherein said rotary member is subjected to an angular moment by a hairspring and an axial drive toward said lock cylinder by a coil spring.